(12) United States Patent
Humphris et al.

(10) Patent No.: US 8,296,856 B2
(45) Date of Patent: Oct. 23, 2012

(54) CONTROL SYSTEM FOR SCANNING PROBE MICROSCOPE

(75) Inventors: Andrew Humphris, Oxfordshire (GB); David Catto, Norfolk (GB)

(73) Assignee: Infinitesima Ltd., Oxfordshire (GB)

( * ) Notice: Subject to any disclaimer, the term of this patent is extended or adjusted under 35 U.S.C. 154(b) by 0 days.

(21) Appl. No.: 13/147,864

(22) PCT Filed: Feb. 4, 2010

(86) PCT No.: PCT/GB2010/050181
§ 371 (c)(1), (2), (4) Date: Aug. 4, 2011

(87) PCT Pub. No.: WO2010/089601
PCT Pub. Date: Aug. 12, 2010

(65) Prior Publication Data
US 2011/0296561 A1 Dec. 1, 2011

(30) Foreign Application Priority Data
Feb. 4, 2009 (GB) .................................. 0901772.4

(51) Int. Cl.
*G01N 13/16* (2006.01)
*G01Q 10/06* (2010.01)
*G01Q 30/04* (2010.01)

(52) U.S. Cl. .......... 850/1; 850/5; 850/8; 850/10; 850/21

(58) Field of Classification Search ................... 850/1, 5, 850/8, 10, 21
See application file for complete search history.

(56) References Cited

U.S. PATENT DOCUMENTS

| 5,117,110 | A | 5/1992 | Yasutake |
| 5,939,709 | A * | 8/1999 | Ghislain et al. ............... 250/216 |
| 6,427,345 | B1 * | 8/2002 | Alvis ............................... 33/121 |
| 6,710,339 | B2 * | 3/2004 | Egawa et al. ..................... 850/1 |
| 2001/0030286 | A1 | 10/2001 | Egawa et al. |

OTHER PUBLICATIONS

Yao et al., "Scanning Probe Lithography with Real Time Position Control Interferometer," Nanotechnology (2002) pp. 13-15.

* cited by examiner

*Primary Examiner* — Nikita Wells
(74) *Attorney, Agent, or Firm* — Volpe and Koenig, P.C.

(57) ABSTRACT

A control system (32, 75) is for use with a scanning probe microscope of a type in which measurement data is collected at positions within a scan pattern described as a probe and sample are moved relative to each other. The control system is used in conjunction with a position detection system (34) that measures the position of at least one of the probe and sample such that their relative spatial location (x, y) is determined. Measurement data may then be correlated with empirically-determined spatial locations in constructing an image. The use of empirical location data means that image quality is not limited by the ability of a microscope scanning system to control mechanically the relative location of probe and sample.

21 Claims, 5 Drawing Sheets

CONTROL SYSTEM FOR SCANNING PROBE MICROSCOPE

This application is a 35 U.S.C. §371 national phase application of PCT/GB2010/050181, which was filed Feb. 4, 2010 and claimed priority to GB 0901772.4, filed Feb. 4, 2009, both of which are incorporated herein by reference as if fully set forth.

This invention relates to the field of probe microscopy and, in particular, to a control system used to drive and monitor the relative positions of a sample and microscope probe during the course of a scan.

The principle behind the scanning probe microscope (SPM) is to carry out a mechanical scan over a sample surface with a nanometric probe tip in order to produce an image of the sample. Features within the image result from variations in an interaction between the tip and the sample.

A particular example of the SPM is the atomic force microscope (AFM) in which the force interaction between the sample and the sharp tip of a probe is monitored. The present invention is applicable to all SPMs and the AFM is described herein by way of example only. The probe of a typical AFM includes a very small cantilever that is fixed to a support at its base and with the tip at its opposite (free) end. When the probe tip is brought into close proximity with the sample, an interaction force develops between sample and tip. If the tip is in motion, for example oscillating, the interaction force will modify this motion in some way. If the tip is static, the force will displace the tip relative to the sample surface.

During the course of a scan, the strength of the interaction between tip and sample surface will change as the characteristics of the surface beneath the probe tip change. A three axis high-resolution scanner typically generates relative motion between the sample and the probe, driving either the sample and/or probe support. The effect of the interaction force on either the position and/or motion of the probe tip is monitored during the course of the scan. In standard AFM operation, the strength of the interaction force is held constant. That is, its effect on the probe is observed and a feedback system operates to adjust the separation of the sample and the base of the probe in response to any change so as to return the observed parameter to a predetermined value, its set point. Data associated with this adjustment (conventionally, vertical or "z" movement) is collected and may be used to construct an image of the sample across a region of its surface.

The interpretation of the image formed by the AFM will depend to some extent to the nature of the surface under investigation. Surface topography generally makes the most significant contribution to the image, the height of the sample being closely followed by the probe as it scans, but other characteristics such as surface hydrophobicity and hydrophilicity, visco-elasticity, etc. may also contribute. The probe and microscope may further be adapted to measure other sample properties, such as magnetic or electric fields, via suitable interaction forces.

AFMs may be designed to operate in a variety of imaging modes. In contact mode the probe remains in substantially continuous contact with the sample. In dynamic mode the probe is oscillated, bringing it periodically into close proximity or contact with the sample.

If a static tip is used to probe the surface then interaction between the tip and the surface is monitored during the course of a scan using the effect that the interaction force has on the bend or deflection of the cantilever. As the interaction force between tip and surface changes, the tip is either pulled towards or pushed away from the surface. This tip movement is communicated to the cantilever part of the probe, which accordingly bends or flexes along its length. The AFM is set to measure the deflection of the cantilever with a position sensitive detector such as an optical lever system or other deflection detector as is well known in the art. Deflection, in this context, refers to the tilt of an upper surface of the probe, which is used by the AFM to provide an indication of cantilever bend.

Alternatively, the AFM may be operated in dynamic mode. The probe is typically oscillated at or near one of its resonant frequencies. Variations in the sample-probe interaction affect the motion of the probe. In particular, the amplitude, phase and resonant frequency of these oscillations may be monitored and probe-sample separation adjusted in order to maintain constant average interaction.

The AFM can be configured and used in many different modes. It should be borne in mind that the above description of contact and dynamic modes is to provide a general introduction to the particular field of atomic force microscopy and is not intended to imply any limitation to the field of application of this present invention in any way. This invention is indeed suitable for use with any scanning probe microscope system.

Regardless of their mode of operation, AFMs can be used to obtain images on an atomic scale of a wide variety of samples in a range of environments (air, liquid or vacuum). Typically, they employ piezoelectric actuators, optical lever deflection detectors and very small cantilevers produced using silicon fabrication techniques. Their high resolution and versatility has led to their finding application in diverse fields such as industrial inspection, semiconductor manufacturing, biological research, materials science and nanolithography.

Other scanning probe microscopes investigate other interactions between a probe and sample surface. For example, scanning near-field optical microscopes measure the optical near-field interaction between the tip and the sample; capacitance microscopes measure a capacitance developed between the sample and a metallic probe; scanning tunnelling microscopes measure the tunnelling current between a conductive tip and conductive sample. One thing that is common to all such microscopes however is that they effect a scan between probe tip and sample and that measurements are taken at intervals during the scan. A range of probe types may be employed: cantilevered, metallic, optically transmissive and a vast array of samples may be investigated.

One problem that must be addressed by all such SPM systems is the need to correlate a measured value with the spatial (x,y) location at which that measurement is made. The x,y coordinates for each measurement are clearly dictated by the x,y scan pattern that is effected by the microscope and the timing of sampling points during this scan. Each measurement is accordingly taken at a particular spatial location and this spatial location must be mapped to a corresponding location in the image in order to construct an image of the surface. Each measurement spatial position generally corresponds to a pixel in the image.

It should be noted that absolute values of x and y are not necessary. What is needed is a knowledge of the relative positions of probe and sample in order to construct the image. Values are therefore made relative to any convenient origin, for example the start position of the scan.

In order to derive the pixel locations, a microscope control system generates a known signal that is input to the x,y scanners. For the purposes of this example, the scanners are set to drive the probe across the sample, but they could equally be set to drive the sample beneath the probe. In response to the signal input, the scanners move the probe mount to a known position. The control signal is varied such that the probe (via its connection to the mount) is scanned across the sample area to be imaged. At set intervals during the scan the microscope records the signal measurement at that point. As the trajectory of the probe is known and the time intervals at which measurements are made, the spatial location of each measurement value is also known. The control system captures the measurements and uses the known spatial position of the probe to locate these measurements in the image.

Recent advances in probe microscopy have led to much faster scanning techniques with more rapid data collection times. With this new generation of microscope, such as that described in PCT patent applications WO 02/063368 and WO 2004/005844, it is however becoming increasingly apparent that constraints imposed by the microscope components themselves are limiting image collection times.

In order to cope with these higher scanning speeds, alternative detection systems have been developed that measure directly the vertical position of the probe tip as it traces the surface of the sample. The system described in WO 2009/147450 uses interferometry to measure the height of the back of the probe above a reference level, for example the surface of the stage. Measurement of the probe's vertical position at each pixel location provides a direct indication of the topography of the sample. This is to be contrasted with the above-described the prior art AFM, which is a nulling system in that it is only required to hold the probe orientation, monitored via its deflection, constant. In the prior art system, probe height information is obtained from the drivers that operate the feedback loop that ensures constant deflection.

As scanning speed increases, the ability of the x, y drivers to move the probe along the requested trajectory and to the desired location is reduced. Inaccuracies in the ability to position the probe at the desired location lead on to inaccuracies in pixel positioning in the image. This reduces the quality of the image. In the prior art, closed loop scanners may be used to improve the ability of the microscope to position the probe at the location requested by the control system. The closed loop scanning control system includes a sensor to monitor the position of the scan stage (supporting probe or sample). The output of the sensor is included in a feedback loop, which adjusts the control signal input to the x,y scanners in order that the scanners reproduce more closely the motion that is requested by the control system.

Regardless of this closed-loop refinement however, the prior art approach to determining the spatial location of a measurement position is to drive the probe along a known trajectory and to collect measurements at set intervals along this trajectory. Measurement positions and thus the positions of pixels in the image will therefore be at correspondingly known spatial locations. This approach is limited by the degree to which the true probe position corresponds to its theoretical position, as demanded by the control system. That is, by the ability to control the scanners mechanically such that they move to a known position.

It is an object of the present invention to provide a control system for use with a scanning probe microscope that provides an alternative determination of spatial location of an image measurement point, which is not limited by the ability of the scanning system drivers to mechanically control the location of the probe or sample.

Accordingly, the present invention provides a control system for use with a scanning probe microscope of a type in which measurement data is collected at positions within a scan pattern described as a probe and sample are moved relative to each other. The control system is arranged to set up an array of pixels, each pixel having an area that maps to a finite spatial area of the sample surface. For each measurement position, a spatial location of that position is determined empirically and the value of a data point measured is associated with the pixel whose mapping is to the sample area that includes the empirically-determined spatial location. The data values associated with a single pixel area are combined to determine a final data value for that pixel position.

It can thus be seen that this approach differs markedly from the prior art. Prior art image collection systems are essentially dictated by the form of the image. That is, the image spatial characteristics are determined prior to data collection and the scanning system drives the probe to collect data at each pixel point in the image. By way of contrast, the present invention makes no supposition as to where the scanning system drives the probe to take a measurement point. The probe may be driven freely and data points collected at any point along the trajectory. All that is important is that each data point is collected at a measured spatial location. When constructing the image, the conventional pixel array is used but it is only after data collection that the image is constrained to take this form. Oversampling can be used to improve the accuracy of the data value at the relevant pixel by allowing an average value to be generated for that pixel.

Although the probe may be driven freely, as specified above, this represents only one implementation of this invention. More commonly, the control system will drive the probe along a trajectory that approximates a predetermined scan pattern, for example a raster scan. This invention improves on the prior art in that any deviation from the intended trajectory will not result in an error or inaccuracy in the image. It is clear therefore that the control system of this invention may be used with prior art microscopes, but additionally provides the capability of removing errors arising from incorrect positioning of the x, y scanner.

Two approaches may be taken for the empirical determination of probe spatial location. First, the x and y coordinates of the probe may be measured directly. Secondly, and with reduced data processing requirements, the system may be calibrated and a model constructed in which control system drive signal is mapped to probe spatial location. Thereafter, the model is used in order to predict probe spatial location from a knowledge of the signal sent to the drivers.

There are a number of reasons as to why the actual motion generated by a scanner (or x,y drivers) may not follow the form of the signal that is driving it. In the first place most SPMs employ piezoelectric drivers, whose operation is fundamentally based on the nonlinear piezoelectric effect. In addition there may be hysteresis in the response, anomalies due to mechanical resonances in the system and other instabilities. This departure from a readily predictable scanning behaviour becomes more significant at fast scanning speeds and high-resolution imaging.

Closed loop scanners do offer noticeable improvement at low scan speeds, typically less than 10 Hz. However this means of correction becomes less effective at high scan speeds.

The control system may include a scanning system arranged to control at least one of the probe or sample in order to change their relative position and a position detection system arranged to measure the spatial location of the at least one of the probe and sample that is controlled by the scanning system. Ideally, the position detection system includes an interferometer. Interferometry is an accurate technique by which small displacements may be measured and, as such, is suited for use with this invention.

In another aspect the present invention provides a method of imaging using a scanning probe microscope, the method comprising the steps of:
- (a) scanning a probe relative to a sample surface, the probe comprising a nanometric tip in close proximity to the surface and, at multiple data points during the scan, collecting image data relating to an interaction between the probe and surface at an empirically-determined spatial location;
- (b) processing the data to generate an image in the form of a pixel array, each pixel being mappable to a finite area of the sample surface, wherein
  - (i) for each collected image data point, the value thereof is assigned to a pixel location, the pixel being the one that maps to the area of the surface that encloses the empirically-determined spatial location of that data point; and
  - (ii) for each pixel, combining the values assigned to that location, thereby determining an updated data value for that pixel position; and
  - (iii) constructing an image based on the updated data values for the pixel positions.

The updated data value for one image data point may be incorporated in the image prior to processing the next image data point. That is, data collection and processing may be done in real time. Alternatively, the mage may be constructed after processing multiple image data points, for example all those collected within a selected sample area.

Embodiments of the invention will now be described by way of example only and with reference to the accompanying drawings.

Figure 1:
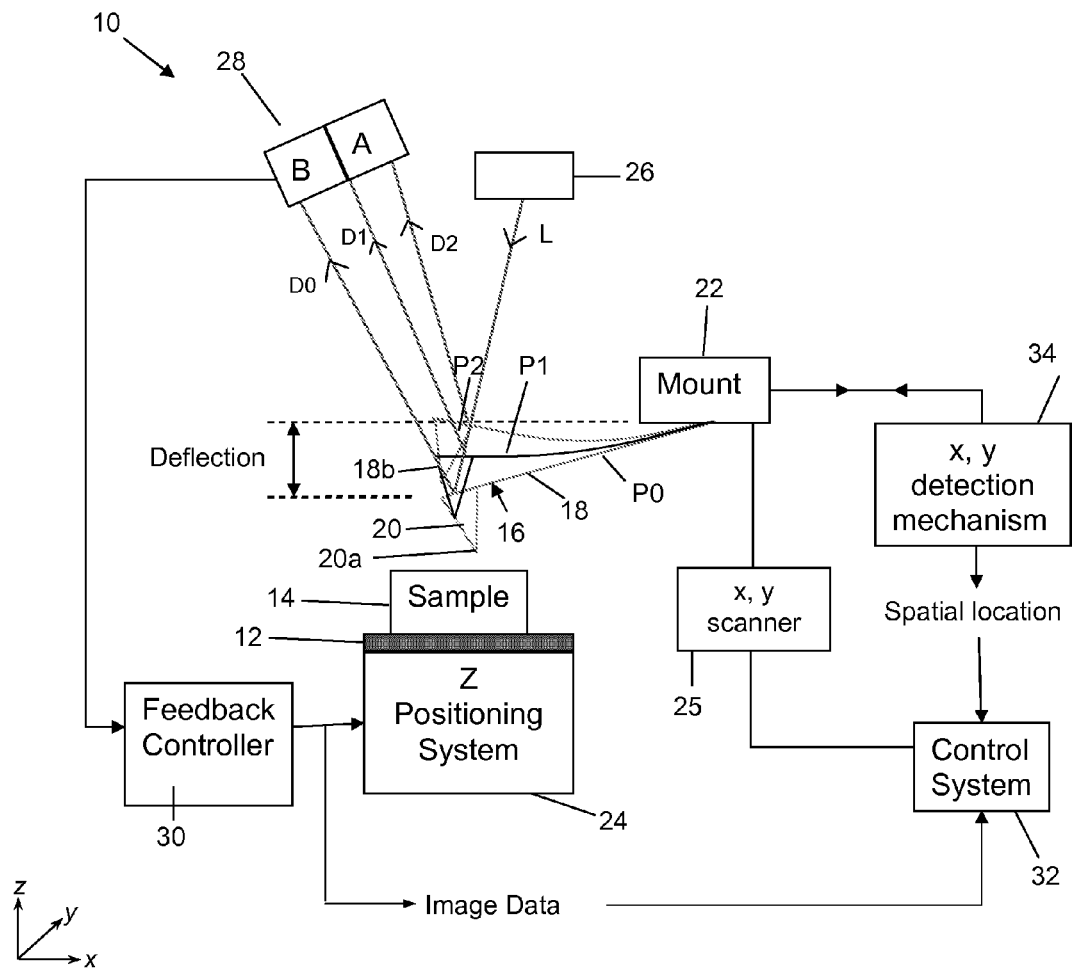
FIG. 1 is a schematic illustration of the components of an atomic force microscope showing a scanning control system in accordance with this invention.

FIG. 1 illustrates the basic components of an AFM 10 operated using a control system in accordance with this invention. The AFM 10 comprises a moveable stage 12 on which a sample 14 to be investigated by a probe 16 is mounted. The probe 16 comprises a cantilever beam 18 and a tip 20, which tapers to a fine point 20a, and which is located towards one end of the cantilever beam 18. The other end of the cantilever beam 18 is fixed to a mount 22. A z-positioning system 24, comprising piezoelectric drivers that are operable to move the stage 12 towards and away (z-direction) from the probe 16 is connected to the stage 12. An (x,y) scanner 25 is connected to either the mount 22, the stage 12 or both and includes drivers that are operable to provide relative motion between the sample 14 and probe 16 in the plane (x,y) of the sample. A light source 26 is arranged to emit a beam L which is directed onto an upper surface (back) 18b of the cantilever beam 18 at the position at which the tip 20 is mounted. Light reflected from the back 18b of the cantilever propagates to a position sensitive detector (PSD), typically a split photodiode 28, and a feedback signal is generated. The output of detector 28 is connected via a feedback controller 30 to the z-positioning system 24. A microscope control system 32 controls operation of the scanners (x,y scanner 25, z-positioning system 24) and also captures measurement data in order to construct an image of the sample.

The feedback signal from the PSD may be processed to extract quantities such as probe deflection, amplitude, phase or other parameters. For simplicity, this prior art AFM will be described as operating in contact mode using feedback based on probe deflection.

The microscope in accordance with the present invention, and in contrast to conventional AFMs, includes an x,y detection mechanism 34, which is arranged to obtain an indication of the spatial location of the probe mount 22. Spatial location information, along with the feedback data, is input to the control system 32 for analysis.

The probe 16 is generally (for AFM) fabricated from silicon or silicon nitride. Typically, the cantilever 18 is around 50-200 μm long, 20-50 μm wide and around 0.2-2 μm thick, but this size can of course be varied according to application. The shape may also be varied: typically it is rectangular or triangular with, in the latter case, the tip 20 at its apex. The tip 20 is typically 5 μm at its base, 3-10 μm high and with an end radius of curvature of 10-20 nm. In use, the fine point 20a at the end of the tip 20 is oriented towards the sample.

In taking an image of the sample, the prior art AFM 10 operates as follows. Using the z-positioning system 24, the tip 20 is first moved towards the sample 14 until the cantilever 18 deflects to a predetermined level. This predetermined degree of cantilever 18 deflection, for example that indicated in FIG. 1 by probe outline P1, is the set point for the feedback controller 30.

The deflection of the cantilever 18 is monitored using the light beam L and the detector 28. The detector 28 is split across its length into independent detector areas A and B. The output signal from the detector is the difference between the intensity of light illuminating area A and that illuminating area B. The intensity difference output from the detector therefore provides an indication of cantilever deflection. When the cantilever 18 is bent to position P1 the output from the detector 28 is equal to the set point of the feedback loop.

The x, y scanner 25 is now operated to scan the tip 20 across the surface of the sample 14, usually following a raster pattern. When the tip 20 encounters a part of the surface with increased height, the tip 20, which traces the surface, is forced further upwards. This, in turn, causes the probe 16 to increase its flexion to, for example, position P2. With the probe 16 in this position, the angle of incidence between light beam L and the surface defined by the back 18b of the cantilever is varied. Light L is accordingly reflected along a different path D2 and is therefore incident more fully on area A of the detector than area B. That is, the intensity difference $I_A$-$I_B$ between light incident on the two parts of the detector 28 has changed from its previous (set point) value. It can therefore be seen that the value of the intensity difference provides an indication of the deflection of the cantilever and, importantly, an indication as to how far it has been deflected from its set point. The feedback controller 30 is set to adjust the vertical position of the probe mount 22 to move it away from the sample 14 and so to return the deflection signal received from the detector 28 to its set point. The probe 20 is accordingly maintained in the orientation shown as P1.

Conversely, when the tip 20 encounters a part of the surface with decreased height, the bias on the cantilever beam 18 that results from its set-point bending pushes the tip 20 downwards. The probe 16 will therefore reduce its flexion and adopt an orientation such as that indicated by P0. With this orientation, the angle of incidence between of light beam L on the back 18b of the cantilever is such that the beam L is reflected along path D0. Area B of the detector is accordingly illuminated more fully than area A. The feedback controller 30 again adjusts the vertical position of the probe mount 22 to move it towards the sample 14 and so to maintain the deflection signal at its set point. The probe 20 is accordingly maintained in the orientation shown as P1. In this way, the feedback of the microscope system operates continuously to ensures that the deflection of the probe 16, as determined by the angle of tilt of the back 18b of the cantilever above the tip, is held substantially constant during the course of a scan. This in turn ensures that the average interaction force between probe tip 20 and the sample 14, which serves to attract or repel the tip to or from the surface, is also held substantially constant. As the scan progresses, the vertical position of the mount set by the z-positioning system is measured in order to provide an indication of the height of the sample surface. This image data is captured by the control system 32 for image construction and analysis.

The x,y detection mechanism 34 includes an optical arrangement (not shown) that directs light from two different directions, in a plane perpendicular to the sample height measurement, onto the mount 22. The sides of the mount are constructed to provide reflective surfaces in non-coplanar planes. A first beam of light is reflected from one of the mount surfaces and input to an interferometer where it interferes with a reference beam reflected from a reference (or x origin) point for this component. The second beam is similarly reflected from the second mount reflective surface and input to an interferometer for interference with a second reference beam reflected from a second reference (or y origin) point. From these two interferometric measurements the spatial location of the mount 22 is extracted and input to the control system 32. As the mount is in a fixed spatial relationship with the probe tip, this provides a measurement of the spatial location of the tip relative to the sample. The control system thus receives or derives three measurements: the feedback signal indicative (for this AFM configuration) of the height of the probe (z) and the spatial location coordinates (x,y), which it processes to form an image.

As with the prior art, spatial location coordinates are only required to define the position of the probe relative to the sample. This allows flexibility in the selection of a suitable reference beam. In one embodiment, the measurement beam may be reflected from, for example, the probe and the reference beam from the sample stage. The interference patterns generated therefore provide a direct indication of the relative positions of probe and sample. Moreover, this arrangement can be used irrespective as to whether the x,y scanner 25 drives the probe, the sample or both.

Interferometric methods of extracting the path difference between two optical beams are well known in the art and so will not be described in any further detail.

It is of course necessary to synchronise measurement of a data point with measurement of its spatial location. Various techniques may be used to achieve this. A clock mechanism may be used to ensure that all measurements are collected at the same point in the scan. Alternatively, each individual measurement may be time stamped. Interpolation is then used to provide the spatial location at the time of a particular data measurement. Another option is to collect and process the data in real time.

This technique to determine empirically the spatial location coordinates of the probe as a sample measurement is taken differs significantly from the method of probe location known in the prior art. In a prior art SPM, the microscope control system generates a known signal that is input to the x,y drivers. In response to this input, the drivers move the mount (or stage) to a known position. The control signal is then varied such that the probe is scanned across the sample area to be imaged, or sample scanned beneath the probe. At set intervals during the scan the microscope records the signal measurement at that point. The control system captures these signal measurements and uses the known spatial position of the probe to construct the image.

In the above described embodiment of this invention, a full spatial location characterisation is carried out each time a scan is performed. That is, the spatial position of the probe is monitored continuously. In an alternative embodiment, this characterisation is only carried out in a calibration phase. Calibration may be done as part of the scan or in a pre-scan calibration phase. In the calibration phase, the control system 32 is set to send a pre-determined drive signal to the x,y scanners 34. The response to the signal is determined by the interferometric spatial location measurement described above. A model is then constructed mapping drive signal to scanner response. In further data-gathering runs it is no longer necessary to measure spatial location directly. Provided the same drive signal is used, it is sufficient to convert the drive signal using the constructed model. This embodiment of the invention is particularly useful in the case of a resonant scan in which one or both of the (x,y) scanning drive mechanisms is replaced with a resonator. The resonator is an oscillating drive set to oscillate the probe mount (or sample stage) at or near its resonant frequency. Such resonant scanning microscopes provide a very fast and stable scanning capability. The response to a sinusoidal driving signal can be accurately modelled by deriving a phase shift and gain. The value of the shift and gain will vary from system to system, but it can be seen that only two parameters need to be derived from the calibration phase in order to determine spatial locations for a range of driving signals. Additional parameters can, of course, be used to model more complex forms of driving signal.

Whilst the above-described embodiment is less calculation-intensive, this advantage is gained with some loss in flexibility. In the first embodiment described herein, there is no restriction on the drive signal provided to the x,y scanner. That is, as no model is constructed there is no need for the control system 32 to have any involvement with generation of the driving signal. This embodiment is therefore inherently more flexible in its application to complex driving mechanisms. Additionally, the performance of the first embodiment is not affected by non repetitive variations in the relationship between the drive signals to the scanners and the position of the probe.

As described above the x, y position of the probe is located by means of interferometric measurement of its mount position. Alternatively markers, for example in the form of a reflective cube, may be incorporated in the microscope system for the purpose of providing one or more surfaces for measurement. Ideally, the marker would be located on the probe and the position of the marker measured. This is however difficult to achieve practically. Preferably, the marker is placed near the base in order to minimise interference with the interaction between tip and sample. Alternatively, the marker may be sited on the probe support or at any other location that is in a fixed spatial relationship with the probe. If the sample is moved in order to generate the x,y scan then the marker is placed on the sample stage. In another alternative, a pair of markers may be used: one to reflect the reference beam and the other the measurement beam. If one marker is on the probe and the other on the stage, a direct measurement of the probe/sample relative position is provided. This implementation is advantageous in providing spatial locations irrespective of whether the probe, sample or both are moved during the scan. This may be particularly suited to the scanning microscope described above in which one or both of the (x,y) scanning drive mechanisms is replaced with a resonator allowing, for example, one scan direction to be collected at probe resonance whilst the other is collected by scanning the sample.

The spatial location measurements are not restricted to interferometric methods. Any alternative device that is capable of measuring position to a sufficient degree of accuracy may also be used. Examples of suitable devices for all position measurements are: capacitance sensor, linear variable differential transformer (LVDT), optical lever and position sensitive detector (PSD).

Figure 2:
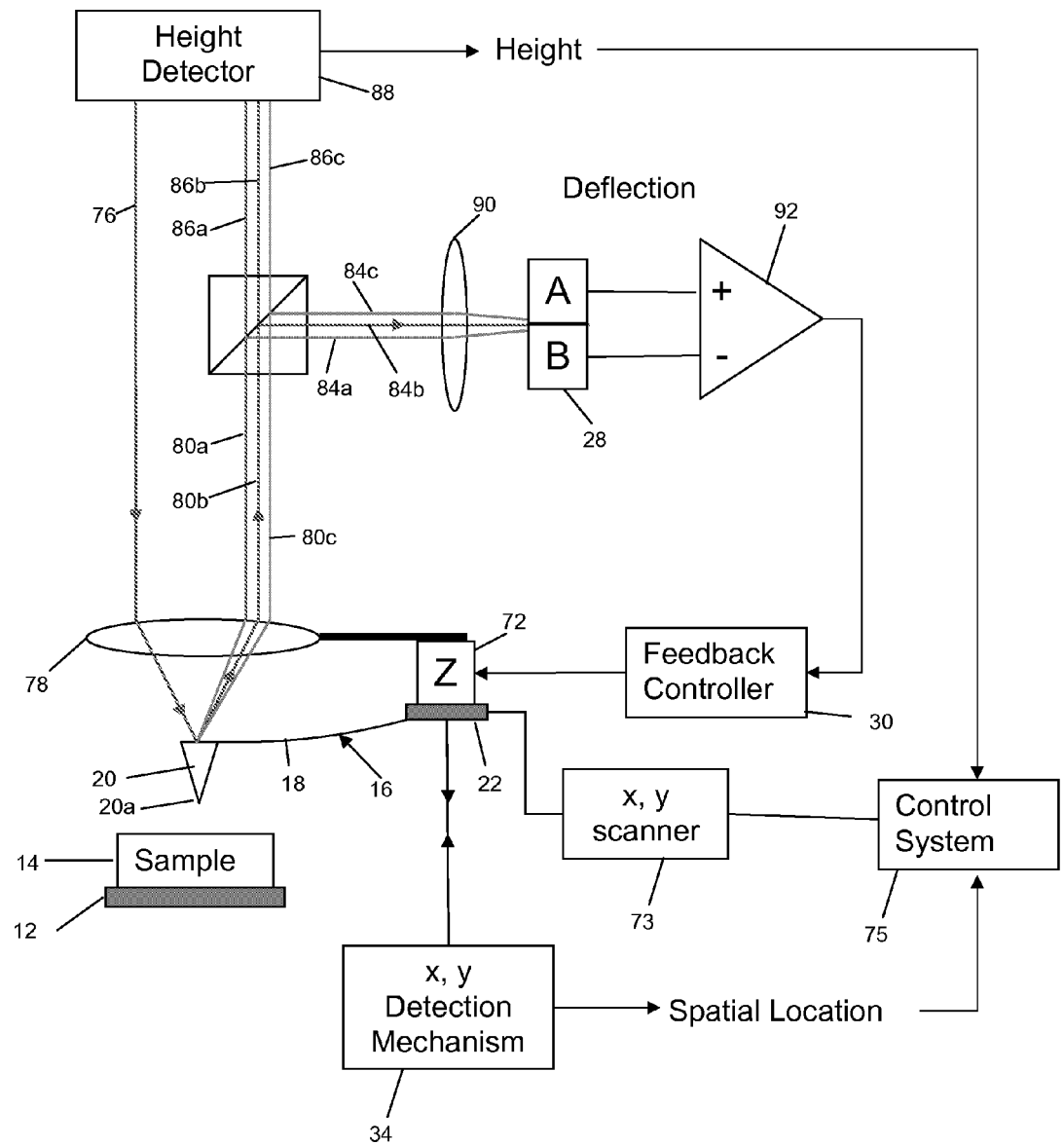
FIG. 2 is a schematic illustration of the components of an atomic force microscope with an interferometric direct height detection system and a second embodiment of a scanning control system in accordance with the present invention.

Turning now to FIG. 2 there is shown schematically an alternative implementation of a probe microscope, indicated generally by 70, that is particularly suited for use with a control system constructed in accordance with the present invention. Elements common to the AFM described previously with reference to FIG. 1 are given the same reference signs. Accordingly, the microscope apparatus shown comprises a moveable stage 12 adapted to receive a sample 14, whose surface is to be investigated by a probe 16. The probe 16 comprises a cantilever beam 18 and a tip 20, which tapers to a point 20a, and which is located towards one end of the cantilever beam 18. The other end of the cantilever beam 18 is supported by a mount 22.

One or more drive motors (72, 73) are used to drive the sample 14 (together with the stage 12) and/or the probe 16 such that they can be scanned relative to each other in three dimensions: x, y and z directions. As is conventional in the field, the z axis of a Cartesian coordinate system will be taken to be that perpendicular to a plane occupied by the sample 14. That is, the strength of the interaction force between probe 16 and sample 14 is dependent both on the xy position of the tip 20 over the sample 14 (the pixel it is imaging), and also on its height above it. The drive motors are categorised in accordance with the direction in which they scan. A z-positioning system 72 is operable to move the tip 20 towards and away from (z-direction) the sample 14. An x,y scanner 73 is operable in response to a signal from a control system 75 to provide relative motion between the sample 14 and tip 20 in the plane (x,y) of the sample, such that the tip 20 is scanned raster fashion, or otherwise, over the sample 14.

In the embodiment shown both the z-positioning system 72 and the x,y scanners 73 are connected to the probe mount 22. The z-positioning system 72 may alternatively be connected to the sample stage 12 (as shown in FIG. 1). The x,y scanners 73 may also be connected to the stage. The drive motors 72, 73 are piezoelectric drivers. Alternatively, they may be based on non-piezoelectric driving mechanisms such as a voice coil or thermal bimorph actuator.

The probe 16 is a low-mass AFM probe and, during a scan, an interaction force is developed between the tip 20 and the sample surface. A probe detection mechanism 74, which will be explained in more detail below, is arranged to obtain an indication of both the vertical (z) displacement of a point 18b at the back of the cantilever above the tip 20 and its deflection (tilt). Data relating to the vertical displacement is output to a system controller 75. Information relating to the tilt/deflection of the back 18b of the cantilever is input to a feedback controller 30, which in turn is connected to the drive mechanism of the z-positioning system 72.

As with the embodiment shown in FIG. 1, the x,y detection mechanism 34 is arranged to obtain an indication of the spatial location of the probe mount 22. Spatial location information, along with the previously mentioned vertical displacement data, is input to the system controller 75 for analysis.

Many alternative techniques may be used to derive a measurement of the lateral (x,y) position of the probe tip. In both the illustrated (FIGS. 1 and 2) embodiments, the probe mount is monitored and its location used to derive that of the probe tip. Alternatively, and as described in relation to FIG. 1, the location of the probe may be observed directly, for example using light reflected from a reflective marker (not shown) fixed to the base of the probe. In fact, if the probe is scanned then any point with a fixed spatial relationship to the probe tip, for example the base or mount, may be used. In other SPM implementations the probe is held stationary as the sample is scanned. In these embodiments, the position of the sample, or point in fixed spatial relationship with the sample such as the stage, is measured during the course of a scan.

The probe 16 is generally (for AFM) fabricated from silicon or silicon nitride and formed to a shape and size as described previously in relation to the prior art.

In taking an image of the sample, the AFM 70 operates as follows. Using the z-positioning system 72 and further drivers, the sample 14 is first brought into contact with the tip 20 at the start position of the spatial (x,y) scan. Conventionally, in AFM terminology, the tip 20 is said to be in contact with the sample 14 when the atomic interaction force is in the repulsive regime. Once the probe 16 makes contact with the sample surface, the tip 20 is therefore pushed upwards. The base of the cantilever 18, at the side remote from the tip, is held in position by the mount 22 and so the cantilever 18 is bent or deflected upwards. As is conventional, and as described in relation to the prior art, the mount 22 is lowered, moving the probe 16 towards the sample 14 until the cantilever bend reaches a predetermined level. This predetermined level is the set point for the feedback controller 30.

As the scan progresses, the tip 20 moves up and down as surface height/interaction force varies. As it moves, the degree of tilt is changed, which alters the signal fed to the feedback controller 30 and the z-positioning system 72 is adjusted.

The operation of the direct height detection system will now be described in more detail. A light source (not shown) emits a laser beam 76 that is focused by objective lens 78 onto the back 18b of the cantilever. Reflected light 80a, b, c is collected by the lens 78 and directed towards a non-polarising beamsplitter 82. As can be seen from FIG. 2, the tilt of the cantilever 18b affects the angle at which light is reflected. If the probe is maintained at its set feedback position, the reflected beam follows path 80b. If however, the cantilever back 18b is tilted leftwards (relative to the figure) the reflected beam 80a will be deflected anticlockwise and a rightwards tilt will deflect the reflected beam 80c clockwise. As the back 18b of the cantilever is located at or near the focal point of the lens 78, an angular variation in the reflected beam is converted to a lateral displacement after the lens. That is, regardless of angular tilt, the reflected beam 80a, b, c will propagate parallel to the optical axis of the detection system, a leftwards tilt producing a leftwards lateral displacement and a rightwards tilt generating a rightwards displacement relative to the set feedback position.

The beamsplitter 82 is arranged such that it reflects through 90° substantially half 84a, b, c the light incident on it and transmits the other half 86a, b, c. The transmitted component 86a, b, c is input to an interferometer 88. In the interferometer, the reflected beam 86a, b, c is interfered with a reference beam reflected from the upper surface of the stage 12. Alternatively, another fixed point with known relationship to the stage surface may be used. This provides a measure of the path difference between the two beams and hence an indication of the height of the back 18b of the cantilever above the stage surface. Variations of this measured height are extracted and input to the system controller 75 to form an image.

The components 84a, b, c reflected from the beamsplitter 82 are condensed by lens 90 onto a deflection detector 28. The detector 28 is split across its length into independent detector areas A and B. The output signals generated from these areas are input to a difference amplifier 92, which outputs a signal equal to the difference between the two channels. The detector 28 is aligned with the collection optics such that when the cantilever back 18b is tilted to its set deflection position, then the output from the difference amplifier will also be at its set point. That is, the reflected light 80b, 84b is distributed between channels A and B such that the difference in channel output is a set value. A leftwards tilt of the back 18b of the cantilever means that the signal from the detector 28 increases in channel B, leading to a fall in output from the difference amplifier 92. Conversely, a rightwards tilt means that channel A receives the signal increase and a rise in output is generated by the difference amplifier 92. The feedback controller 30 operates the z-positioning system 72 in order to maintain the signal received from the difference amplifier 92 at its set point.

Independently of the feedback signal, or equivalently deflection of the cantilever, the true probe height above the surface is measured by the interferometric height detection system. The feedback system is accordingly used to ensure that the average deflection is maintained at a constant level.

It is important that the light 76 of the detection system is focused on the back 18b of the cantilever. For this reason, the z-positioning system is also connected to the objective lens 78 and arranged such that if the probe 16 is raised or lowered, the lens 78 is raised or lowered by an equal amount. In an alternative embodiment, the objective lens 78 is selected to have a depth of focus greater than the range of movement expected from the tip. There is accordingly no need to adjust the position of the objective with respect to the tip 20.

It is to be noted that although this detection system is described in relation to an AFM, it can be used for all scanning probe microscopes, in which it is important to determine accurately the height of a probe tip.

In this embodiment the x,y detection mechanism 34 and the interferometric height detector of the probe detection system operate in much the same way, the main difference being that two separate measurements are required in order to derive x and y coordinates. Accordingly, the x,y detection mechanism 34 operates as described above in relation to FIG. 1 The control system 75 of this embodiment receives or derives three measurements: the height of the back of the probe (z) and the spatial location coordinates (x,y), which it processes to form an image.

As with the FIG. 1 embodiment, timings of x,y and z measurements are synchronised by means of a clock mechanism, interpolation or otherwise. The full spatial location characterisation may be carried out for each scan or only during a part of a scan, or in a pre-scan calibration phase.

In the embodiments described above, each reference beam is arranged to have a fixed optical path length relative to the x, y or z position of the sample. The reference beam for, for example, the z position could accordingly be reflected from the surface of the stage on which the sample is mounted or from a retroreflector whose position is linked to that of the stage, as described above. Alternatively, the relationship between reflector and sample z position does not have to be fixed. In such an embodiment the reference beam may be reflected from a fixed point, the fixed point having a known (but varying) relationship with the z position of the sample. The height of the tip is therefore deduced from the interferometrically-measured path difference and the z position of the sample with respect to the fixed point. Nor need the reference positions for the x and y measurements (in any embodiment) remain fixed. A moving origin may be advantageous in eliminating systematic errors.

The interferometers described above are homodyne systems. Alternative interferometer systems, including heterodyne interferometers, capable of measuring a change in optical path length, may also be employed with this invention.

As before, the spatial location measurements are not restricted to interferometric methods. A capacitance sensor, linear variable differential transformer (LVDT), optical lever and position sensitive detector (PSD), among others, may alternatively be used.

Figure 3:
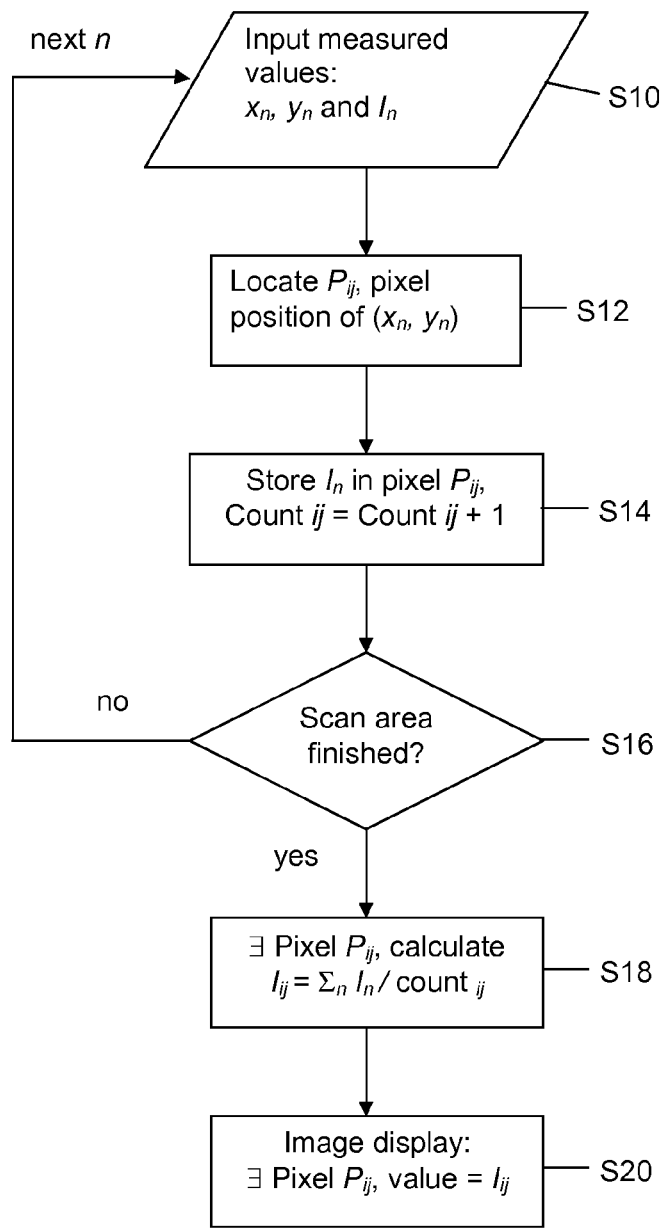
FIG. 3 is a flow chart illustrating the steps involved in constructing an image from data collected using a scanning control system in accordance with this invention.

Regardless of the details of the implementation, the control systems 32, 75 in accordance with the present invention all received three measurements: one indicative of a measured parameter (the height of the back of the probe (z) in the AFM implementations described) and the spatial location coordinates (x,y), which are processed to form an image. With reference to FIG. 3, the steps involved in processing these measurements to form an image will now be explained.

Image processing is carried out by first defining a pixel array $(P_{m,n})$, for example, 100 by 200 pixels. Each pixel of the image has a finite extent within the image and corresponds with a finite area of the sample surface. The resolution provided by the image processing system is limited by the size of a single pixel. Example pixel arrays are shown in FIG. 4 and will be described in more detail below.

At step S10 measured values $x_n$, $y_n$ and $I_n$ are read by the control system 32 75. The symbol $I_n$ is used as a representative measurement extracted by any scanning probe microscope system. It may be a height measurement extracted by an AFM such as those described above, an optical intensity measured by a scanning near-field optical microscope, capacitance, magnetic force, surface viscosity or other measurement representative of a sample property or indeed any spatially correlated measurement which is to be collected. The scope of application of this control system will be apparent to one skilled in the art.

If measurements are not simultaneous, then values $x_n$, $y_n$ corresponding to a particular $I_n$ will not be known. In such embodiments, a series of x and y measurements are taken at time intervals t. The values $x_n$, $y_n$ at a time $t_0$ at which the value of $I_n$ is measured can then be found by interpolation.

In a still further alternative implementation, a series of x and y measurements are again taken at time intervals t. Once set values of $x_n$ and $y_n$ are detected, then the microscope is instructed to measure a value of $I_n$. That is, the microscope is scanned and the data measurement collected at predetermined points.

In any case values of $x_n$, $y_n$ and $I_n$ are input to or derived by the control system 32, 75 for processing.

At step S12, for each data point collected by the system, its spatial location $(x_n, y_n)$ is found on an area of the sample surface that maps to a particular pixel, say $P_{i,j}$. Accordingly at step S14, the measurement information $(I_n)$ is associated with pixel $P_{i,j}$, ready to form the image. Each pixel $P_{i,j}$ is associated with a count (count ij), which is increased by 1 every time a value $I_n$ is associated with that pixel position.

At step S16 it is determined whether or not the scan has been completed. This may be the entire scan area, or only a part of the scan area that may be processed as data relating to further part-areas are collected to form the full image. If the scan is still in progress, or further data awaits processing to form the image, then the method returns to step S10 in order to process subsequent measured values of spatial location and image parameter. If the scan is complete then, at step S18, a measurement value is calculated from all of the $I_n$ values that have been written to each pixel $P_{i,j}$. This may be a straight arithmetical average, by dividing by the current count ij value, as shown, or may involve a more complicated mechanism to combine multiple values. At step S20 the image is constructed with the averaged measurement value displayed at each pixel position $P_{i,j}$.

Figure 4A:
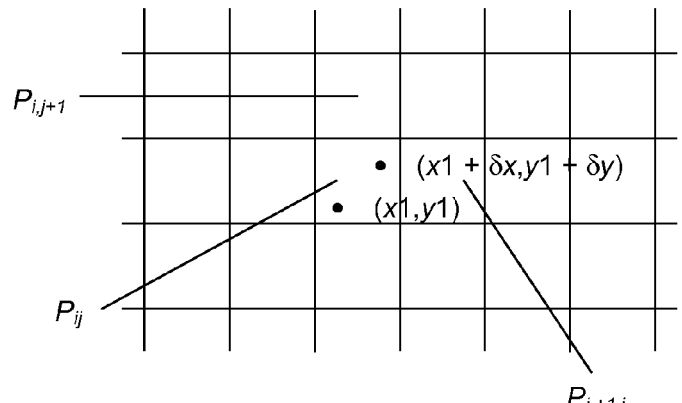
FIGS. 4a, 4b and 4c show data points assigned to representative pixel arrays in construction of an image.

The contrast between this method of data collection and image construction and prior art methods is apparent. In prior art systems, once $P_{i,j}$ has been recorded, the scanner is directed to move to the next pixel position $P_{i+1,j}$ and the $I_n$ measurement repeated. This new data measurement is then written to pixel location and so on across the array. In the present invention however, there is no set spatial relationship between successive data measurements. If a first measurement is at location (x1, y1) and the subsequent measurement at location (x1+δx, y1+δy), then, for anticipated sampling frequencies, it is likely that both (x1, y1) and (x1+δx, y1+δy) fall within the area of the sample that corresponds with the same pixel area $P_{i,j}$. This situation is shown in FIG. 4a. Alternatively, the second measurement may fall within the range covered by $P_{i+1,j}$, (see FIG. 4b) or $P_{i,j+1}$ (see FIG. 4c). In any case, the new data measurement, regardless of any prior data measurements, is written to the pixel to which it corresponds. When all data measurements have been distributed in the pixel array, pixels which hold multiple values are averaged to find a single measurement value for that pixel.

Figure 4B:
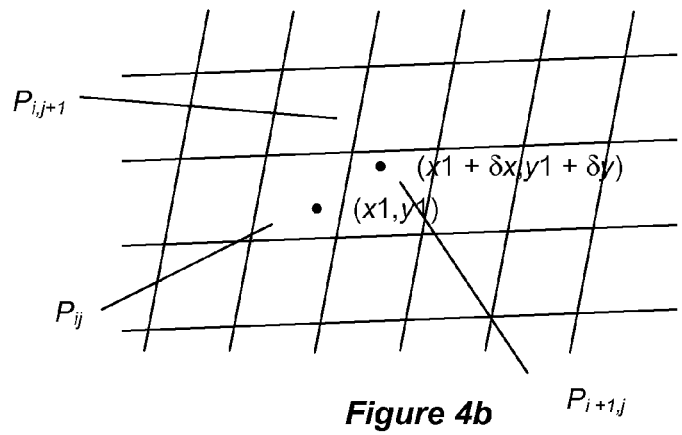
Figure 4C:
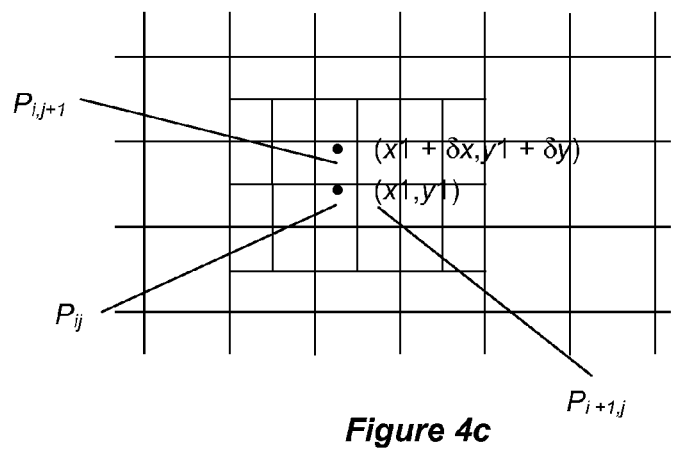

As noted above, FIG. 4 shows three examples of pixel array patterns on which data sampling points (x1, y1) and (x1+δx, y1+δy) are overlaid. It is apparent that different pixel arrangements may be used. Individual pixels may not be square, as shown by the array of FIG. 4b, and the array itself can cover an irregular area. Similarly all pixels may not be constructed to the same resolution, i.e. spatial dimensions. In FIG. 4c a central area has a higher density of pixels in order to obtain higher resolution at an area considered to be of more interest.

Figure 5:
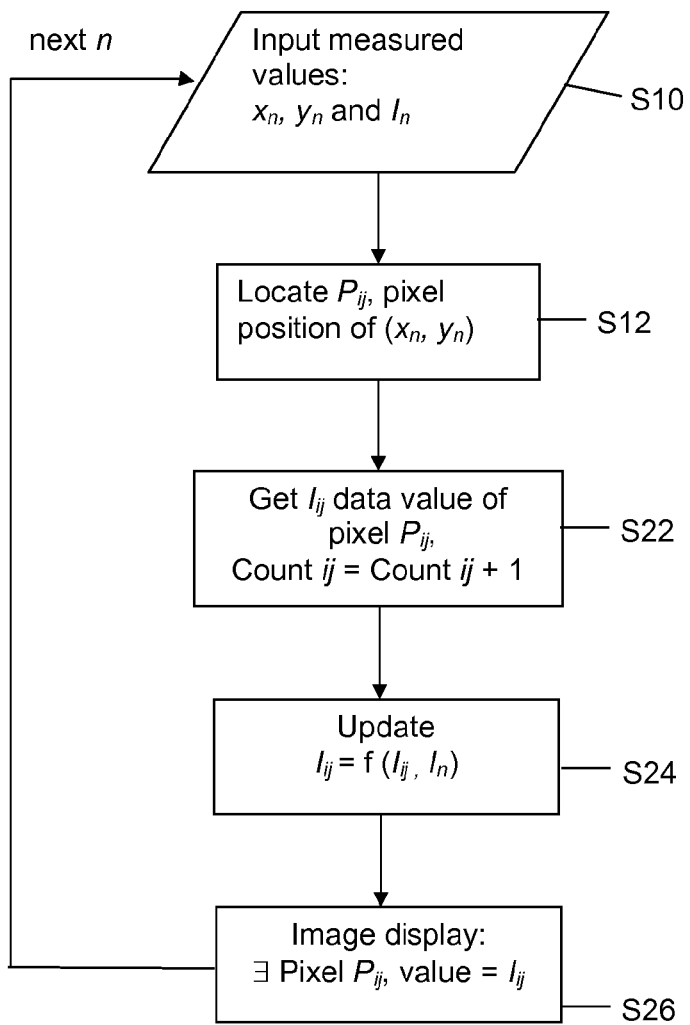
FIG. 5 shows an alternative embodiment of the data processing method of FIG. 3.

FIG. 5 shows an alternative embodiment of the data processing method of FIG. 3 in which the averaging of pixel data is carried out in real time as each measurement is added to the array.

Steps S10 and S12 proceed as for the first embodiment. That is, values $x_n$, $y_n$ and $I_n$ are read by the control system 32 75 and the pixel $P_{i,j}$ associated with spatial location ($x_n$, $y_n$) is identified. In this embodiment, the method then proceeds to step S22 at which the data value $I_{ij}$ currently associated with pixel $P_{i,j}$ is retrieved. If the count ij identifier is to be used in data combining calculations then it is also increased by 1 at this step S22. At step S24 data averaging, or other form of combination is carried out. In its most general form, the data value $I_{ij}$ is updated in accordance with a combining function $f$ that acts on the current value $I_{ij}$ and the input data value $I_n$. This combining function could be any of a number of functions, for example a peak selection: $I_{ij}=I_n$ if $I_n>I_{ij}$ and $I_{ij}$ otherwise, or an average:

$$I_{ij} = \frac{I_{ij} \times \text{count } ij + I_n}{\text{count } ij + 1}$$

Regardless of the mathematics used to effect the combination, the data value $I_{ij}$ associated with pixel $P_{i,j}$ is updated in accordance with all values so far measured at that pixel position. This value of $I_{ij}$ is then displayed S26 at pixel position $P_{i,j}$ in the image.

This embodiment of the invention is advantageous in that real-time data processing and a continually updated display requires less storage capability. At the high data collection rates anticipated for this invention, this is not an insignificant advantage. The same pixel location may further be addressed multiple times. That is, if a sample area requires further investigation, for example to improve resolution, then that particular area can be re-scanned in order to gather more data to write to the relevant selection of pixels.

The more data that is gathered during the scan, the better the resolution of the image. Not only will more pixels have multiple contributions but the likelihood of blank regions appearing in the image is reduced. For this reason the data collection rate is generally set to oversample the image. Data points are then reduced by averaging for each pixel, which provides a tractable amount of data for further image processing.

In a practical implementation of this invention, height measurements are collected at a rate of 40 MHz. This amount of data is, in itself, very difficult to store, review and analyse. The resolution available and hence sample area covered by a pixel is limited by the size of the probe tip, which is of the order of a few nm. Assume that an area 1 μm by 1 μm is to be scanned in 1 second. If 10 nm resolution is available this is a maximum of 10000 sample points, and a frequency of 10 kHz is required. Thus the collection frequency actually oversamples in this instance by a factor of 4000, assuming a linear tip velocity. Data may be processed in real time using, for example, a field gate programmable array (FGPA), which is well suited to this task.

Oversampling is also well suited to the collection of images using a probe scanned at a non-constant probe velocity across the sample. For example, when using a mechanical resonance to generate the relative motion between the probe and sample the scan velocity varies harmonically. A control system in accordance with this invention however may be used to generate an image that nevertheless has a constant pixel size.

What is claimed is:

1. A control system for use with a scanning probe microscope of a type in which measurement data is collected at positions within a scan pattern described as a probe and sample are moved relative to each other, wherein the control system is arranged to set up an array of pixels, each pixel having an area that maps to a finite spatial area of the sample surface and, for each measurement position, a spatial location of that position is determined empirically and the value of a data point measured is associated with the pixel whose mapping is to the sample area that includes the empirically-determined spatial location and wherein the data values associated with a single pixel area are combined to determine a final data value for that pixel position.

2. A system according to claim 1 wherein the spatial location of the measurement position is measured directly during the course of a scan.

3. A system according to claim 1 arranged to derive a model of spatial location from a signal used to drive a scanning system responsible for moving the probe relative to the sample, the model being derived from direct measurement of the spatial location of the measurement position as the scanning system responds to the driving signal during a calibration phase.

4. A control system according to claim 1 wherein the system includes a scanning system arranged to control at least one of the probe or sample in order to change their relative position and a position detection system arranged to measure the spatial location of the at least one of the probe and sample that is controlled by the scanning system.

5. A control system according to claim 4 wherein the position detection system includes an interferometer arranged to measure spatial location.

6. A system according to claim 4 wherein the scanning system controls the probe.

7. A system according to claim 6 wherein the probe incorporates a reflective marker located near to its base.

8. A system according to claim 6 wherein the detection system measures the spatial location of the probe via observation of its mount.

9. A system according to claim 4 wherein the scanning system controls the sample.

10. A system according to claim 9 wherein the detection system measures the spatial location of the sample via observation of a stage on which it is mounted.

11. A system according to claim 1 wherein the system also includes a field programmable gate array or digital signal processor arranged to process measurement data in order to determine the final data values.

12. A scanning probe microscope incorporating the control system of claim 1.

13. A scanning probe microscope according to claim 12 wherein the control system includes a scanning system arranged to control at least one of the probe or sample in order to change their relative position and a position detection system arranged to measure the spatial location of the at least one of the probe and sample that is controlled by the scanning system and wherein the microscope also includes a height detection system for detecting the height of the probe in relation to the sample, both the height detection system and position detection system incorporating an interferometer.

14. A method of imaging using a scanning probe microscope, the method comprising the steps of:
(a) scanning a probe relative to a sample surface, the probe comprising a nanometric tip in close proximity to the surface and, at multiple data points during the scan, collecting image data relating to an interaction between the probe and surface at an empirically-determined spatial location;
(b) processing the data to generate an image in the form of a pixel array, each pixel being mappable to a finite area of the sample surface, wherein
  (i) for each collected image data point, the value thereof is assigned to a pixel location, the pixel being the one that maps to the area of the surface that encloses the empirically-determined spatial location of that data point; and
  (ii) for each pixel, combining the values assigned to that location, thereby determining an updated data value for that pixel position; and
  (iii) constructing an image based on the updated data values for the pixel positions.

15. A method according to claim 14 wherein the updated data value for one image data point is incorporated in the image prior to processing the next image data point.

16. A method according to claim 14 wherein the image is constructed after processing multiple image data points.

17. A method according to claim 14 wherein the spatial location of the measurement position is measured directly during the course of a scan.

18. A method according to claim 14 wherein the spatial location of a measurement point is derived from a model, the model being obtained by driving a scanning system responsible for moving the probe relative to the sample in accordance with a drive signal, directly measuring the spatial location of the driven component (probe or sample) in response to this signal.

19. A method according to claim 14 wherein each step of collecting data is in response to the probe being at a predetermined spatial location with respect to the sample.

20. A method according to claim 14 wherein the step of combining the data values assigned to each pixel location includes the step of averaging said values.

21. A method according to claim 14 wherein the step of combining the data values assigned to each pixel location includes the step of selecting the maximum of said values.

* * * * *